United States Patent Office 3,356,692
Patented Dec. 5, 1967

3,356,692
TETRAHYDROFURYL-BENZENE
SULFONAMIDES
Harald Horstmann, Wuppertal-Vohwinkel, and Hartmund Wollweber and Karl Meng, Wuppertal-Elberfeld, Germany, assignors to Farbenfabriken Bayer Aktiengesellschaft, Leverkusen, Germany, a corporation of Germany
No Drawing. Filed Feb. 17, 1966, Ser. No. 528,082
Claims priority, application Germany, Nov. 30, 1963, F 41,442
10 Claims. (Cl. 260—347.2)

ABSTRACT OF THE DISCLOSURE

Racemic and optically active isomers of 2,4-disulphamyl chlorobenzenes of the formula:

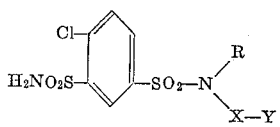

wherein:
R is hydrogen or lower alkyl,
X is a linear or branched chain lower alkylene, and
Y is tetrahydrofuryl, furyl, tetrahydropyranyl, dihydropyranyl or furyls and pyranyls substituted by at least one lower alkyl group,
are useful as saluretics. These compounds have a high $Na^+/K^+$ quotient and eliminate the undesirable contraindication of most saluretics, namely hypokaliaemia. Several processes for the production of these 2,4-disulfamyl chlorobenzenes are disclosed.

This application is a continuation-in-part of application Ser. No. 414,451 filed Nov. 27, 1964 and now abandoned.

The present invention relates to novel sulphonamides and salts thereof useful as saluretics and to their production and administration.

It is known that 2,4-disulphamyl chlorobenzene of the formula:

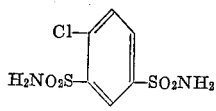

has salt-eliminating activity [cf. Jakob, Dtsch. Med. Wschr., 85, 814 (160)]. It is further known that certain derivatives of 2,4-disulphamyl chlorobenzene in which the sulphamyl radical in the p-position to the chlorine atom is mono- or disubstituted, exceed the above-mentioned compound in their salt-eliminating action. (cf. Belgian Patent No. 598,722; German published specifications 1,096,897 and 1,111,618). It is further known that 6-chloro-7-sulphamyl-1,2,4-benzothiadiazine - 1,1-dioxide of the formula:

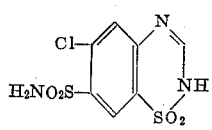

as well as its 3,4-dihydro compound, which can be regarded as derivatives of disulphamyl chlorobenzene, develop a strong saluretic activity with moderate diuretic effect. [cf. U.S.P. 2,809,194, and Experientia 14, 458 (1958)].

All these compounds have in common that, besides the desired separation of $Na^{(+)}$ and $Cl^{(-)}$ ions, $K^+$ ions are simultaneously also eliminated to a greater or lesser extent, so that undesirable hypokaliaemia may arise, especially during prolonged clinical use. For the usefulness of a saluretic, the greatest possible $Na^+/K^+$ quotient is therefore of decisive importance.

It has now been found that 2,4-disulphamyl chlorobenzene of the formula:

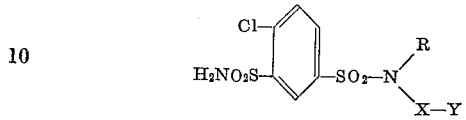

wherein R is hydrogen or alkyl of 1 to 4 carbon atoms, X is linear or branched alkylene of 1 to 4 carbon atoms, and Y is a tetrahydrofuryl, furyl, tetrahydropyranyl or dihydropyranyl group which may or may not be substituted by one or more low molecular weight alkyl groups are obtained when either (a) 3-sulphamyl-4-chlorobenzene sulphochloride-(1) of the formula:

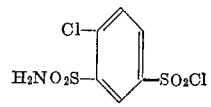

is condensed, in the presence of an acid-binding agent, with an amine of the formula:

wherein R, X and Y have the aforesaid meanings, or (b) a sulphochloride of the formula:

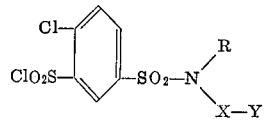

wherein R, X and Y have the aforesaid meanings, is reacted with ammonia or a substance splitting off ammonia, such as an ammonium salt.

Compounds in which Y is a saturated furan or pyran ring can also be obtained when (c) a compound of the formula:

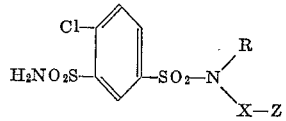

wherein R and X have the aforesaid meanings, and Z stands for a mono- or poly-unsaturated furan or pyran radical which may be substituted by low molecular weight alkyl groups, is hydrogenated.

The resulting compound can be converted in the usual way into an alkali metal salt. When it possesses an asymmetrical centre, it can be resolved into its optical antipodes in customary manner. In the reaction according to (a) optically active bases, and in the reaction according to (b) optically active sulphochlorides can also be used.

The amines required as starting materials according to (a) are to some extent new substances and are obtained, e.g., by catalytically hydrogenating corresponding aldehydes or ketones in the presence of ammonia or primary aliphatic amines.

The following compounds may be used as amine components:

α-tetrahydrofurfuryl-methylamine,
α-tetrahydrofurfurylamine,
α-tetrahydrofurfuryl-ethylamine, α-tetrahydrofurfuryl-propylamine,
α-tetrahydrofurfuryl-isopropylamine,
α-tetrahydrofurfuryl-butyl-amine,
α-tetrahydrofurfuryl-isobutylamine,
α-tetrahydrofurfuryl-sec.-butylamine,
N-methyl-2-(α-tetrahydrofuryl)-ethylamine,
2-(α-tetrahydrofuryl)-ethylamine,
1-(α-tetrahydrofuryl)-ethylamine,
N-methyl-1-(α-tetrahydrofuryl)-ethylamine,
3-(α-tetrahydrofuryl)-propylamine,
N-methyl-3-(α-tetrahydrofuryl)-propylamine,
2-(α-tetrahydrofuryl)-propylamine,
N-methyl-2-(α-tetrahydrofuryl)-propylamine,
5-methyl-α-tetrahydrofurfuryl-methylamine,
5-methyl-α-tetrahydrofurfurylamine,
α-methyl-α-tetrahydrofurfurylamine,
α-Methyl-α-tetrahydrofurfuryl-methylamine,
β-tetrahydrofurfuryl-methylamine,
β-tetrahydrofurfurylamine
N-(α-tetrahydropyranylmethyl)-methylamine,
α-tetrahydropyranylmethylamine,
N-(β-tetrahydropyranylmethyl)-methylamine,
β-tetrahydro-pyranylmethylamine,
1-(6-methyl-α-tetrahydropyranyl)-ethylamine,
2,6-dimethyl-β-tetrahydropyranylmethylamine,
2-dihydropyranyl-(Δ⁵)-methylamine,
N-(2-dihydropyranyl-(Δ⁵)-methyl)-methylamine,
3-dihydropyranyl-(Δ³)-methylamine, and
N-(3-dihydropyranyl-(Δ³)-methyl)-methylamine.

The sulphochlorides required as starting materials according to (b) can be produced by the Meerwein Reaction of corresponding chloroanilines according to the following reaction scheme:

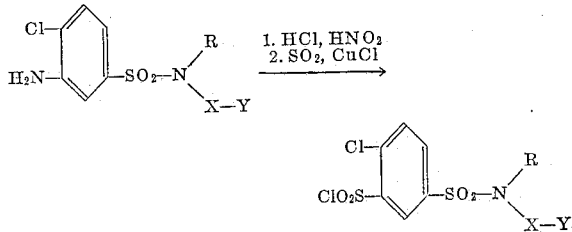

The products of the present invention differ from the initially mentioned disulphonamides by a substantially more favorable $Na^+/K^+$ quotient as may be seen from the following report on experiments.

*Experiments*

The product chlorobenzene-2,4-disulphonic acid amide-2-α-tetrahydrofurfuryl-methylamide-(4) (Compound I) of the formula:

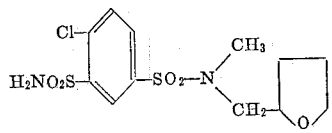

is compared as to its saluretic action with the closest related compound, produced according to German publ. patent specification 1,111,618, the chlorobenzene-2,4-disulphonic acid amide-2-(cyclopentylmethyl)-methylamide-(4) (Compound II) of the formula:

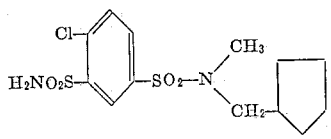

as well as with the clinically satisfactory preparations hydrochlorothiazide (Compound III), chlorthalidone (Compound IV), and the initially mentioned 2,4-disulphamyl chlorobenzene (Compound V).

To test the saluretic activity on dogs the dosing of the individual substances was selected so that the elimination of sodium was approximately equal to that of the controls. The $Na^+/K^+$ quotients determined for equally strong sodium uresis values ($E_{Na\ 1}$, $E_{Na\ 1.4}$, $E_{Na\ 1.8}$) are shown in Table 1.

TABLE 1

|  | I | II | III | IV | V |
|---|---|---|---|---|---|
| $E_{Na\ 1}$ | 12.5 | 4.0 | 9.1 | 3.1 | 3.3 |
| $E_{Na\ 1.4}$ | 9.0 | 4.5 | 5.6 | 4.1 | 2.3 |
| $E_{Na\ 1.8}$ | 8.0 |  | 3.3 | 5.0 | 2.8 |

The experiments showed that the products according to the invention influenced the K-discharge substantially more favorably than the known compounds II–V. To achieve a strong sodium uresis value ($E_{Na\ 1.8}$) about 2–5 mg./kg. per os of the compounds I, III, IV and V was needed. The compound II has a weaker action.

*Observations*

Trained female dogs fed on a standard diet received 20 ml./kg. water with a throat probe. After 40 minutes, control urine was collected for 60 minutes by means of a bladder catheter. The animals then received per os 0.5 to 1.25, 2.5 and 5 mg./kg., respectively, of the substance to be tested, and a second charge of water of 15 mg./kg. The urine formed in the following 120 to 180 minutes was collected and compared with the control urine. The determination of Na and K was carried out by flame photometry, and that of Cl by titration. The increased discharge of K in μ Val./kg./2 hrs. was plotted on millimetre graph paper for the different doses in comparison with the increased discharge of Na. From the curves obtained, those amounts of K could be read which are simultaneously discharged with an increased amount of 1 mVal. Na/kg./2 hrs. ($E_{Na\ 1}$), or of 1.4 or 1.8 mVal. Na/kg./2 hrs. ($E_{Na\ 1.4}$ or $E_{Na\ 1.8}$) as compared with the control. From the values read off, the Na/K quotients were calculated and entered into Table 1.

To test the saluretic activity on rats the animals received per os 2.5, 5, 10 and 20 mg./kg., respectively. Table 2 contains the results after administering 5 mg./kg. The increased discharge of Na, K, Cl and water achieved within 6 hours compared with the controls, as well as the Na/K quotients, are given as 1 for the product of the present invention, the known compounds II–V thus being calculated on such product.

TABLE 2

|  | Na | K | Cl | H₂O | Na/K |
|---|---|---|---|---|---|
| I | 1.00 | 1.00 | 1.00 | 1.00 | 1.00 |
| II | 0.59 | 1.40 | 0.65 | 0.86 | 0.42 |
| III | 1.31 | 3.45 | 1.66 | 1.08 | 0.38 |
| IV | 1.00 | 5.69 | 1.45 | 1.14 | 0.18 |
| V | 1.17 | 2.68 | 0.98 | 1.00 | 0.44 |

The product according to the invention thus leads, with a comparably strong Na-uretic effect also on rats, to a substantially smaller K-discharge. Correspondingly, the Na/K quotient is markedly increased in comparison with the compounds II–V.

*Observations*

Groups each consisting of 10 male rats which had been fed on a standard diet, received on the day of the experiment 20 ml./kg. water with a throat probe (controls) and additionally the substance to be tested was administered per os (test). In the urine collected after 60, 180 and 360 minutes, Na and K were determined by flame photometry and Cl by titration. The increased discharge of Na, K and Cl in μ Val./6 hours/kg. compared with the controls was calculated for all compounds. The values were then calculated with respect to the corresponding values for the product of the process, set equal to 1, and in this form inserted in Table 2. All experiments were repeated twice. The values in Table 2 are therefore each based on experiments on 30 rats.

*Production of starting materials*

By reductive alkylation of furfurol with methylamine, at 70 to 80° C. and 50 to 60 atm., in the presence of methanol and Raney-nickel as catalysts, α-furfurylmethylamine is obtained of B.P. 144° C. at 650 mm. Hg, which is hydrogenated in methanol at 100 to 120° C. and 80 to 120 atm. hydrogen pressure with ruthenium/$Al_2O_3$ as catalyst to α-tetrahydrofurfurylmethylamine of B.P. 48 to 50° C. at 12 mm. Hg. This reaction may also be carried out in one step by reductive alkylation of 96 grams furfurol with 80 grams isobutylamine in 450 ml. methanol at 100° C. and 100 atm. hydrogen pressure in the presence of Raney-nickel to α-tetrahydrofurfuryl-isobutylamine of B.P. 100° C. at 30 mm. Hg.

By a corresponding method there are obtained: α-tetrahydrofurfurylamine, B.P. 45° C. at 12 mm. Hg, α-tetrahydrofurfuryl-ethylamine, B.P. 60° C. at 12 mm. Hg, α-tetrahydrofurfurylpropylamine B.P. 75° C. at 12 mm. Hg, α-tetrahydrofurfuryl-isopropylamine, B.P. 68° C. at 12 mm. Hg, and N-methyl-3-(α-tetrahydrofuryl)propylamine, B.P. 78–80° C. at 12 mm. Hg (from α-furfurylacrolein and methylamine).

α - Methyl-α'-tetrahydrofurfurylmethylamine, B.P. 54 to 56° C., at 14 mm. Hg, α-methyl-α'-tetrahydrofurfurylamine, B.P. 50 to 52° C. at 12 mm. Hg.

By hydrogenation of α-methoxymethyl-α'-furan-carboxylic acid methylamide with $LiAlH_4$, α-methoxymethyl-α-methyleneaminofurfurylamine is obtained of B.P. 64° C. at 0.2 mm. Hg, which is hydrogenated catalytically to α-methoxy methyl-α-methylaminofurfurylamine, B.P. 84 to 86° C. at 15 mm. Hg.

In corresponding manner, there are obtained from β-furan-carboxylic acid methylamide of M.P. 96 to 98° C., N-(β-furylmethyl)-methylamine of B.P. 48° C. at 12 mm. Hg and N-(β-tetrahydrofurylmethyl)-methylamine of B.P. 62 to 64° C. at 14 mm. Hg. By hydrogenation of α-methyl-α-cyano-tetrahydrofuran with Raney nickel as catalyst, α-methyl-α-tetrahydrofurfurylamine is obtained of B.P. 48° at 12 mm. Hg, which is alkylated by dimethylsulphate to α-methyl-α-tetrahydrofurfurylmethylamine, B.P. 70° C. at 40 mm. Hg.

From tetrahydropyran aldehydes and the corresponding amines, there are obtained by reductive alkylation N-(α-tetrahydropyranylmethyl)-methylamine, B.P. 60–64° C. at 12 mm. Hg, α-tetrahydro-pyranylmethylamine, B.P. 84° C. at 20 mm. Hg. N-(β-tetrahydro-pyranylmethyl) methylamine, B.P. 150° C. at 760 mm. Hg, β-tetrahydropyranylmethylamine, B.P. 63–68° C. at 12 mm. Hg, and from 2-dihydropyrane-$\Delta^5$-carboxyaldehyde, 2-dihydropyranyl-($\Delta^5$)-methylamine, B.P. 81° C. at 35 mm. Hg, N - (2-dihydropyranyl-($\Delta^5$)-methyl)-methyl-amine, B.P. 66° C. at 14 mm. Hg.

The chlorobenzene-2,4-disulphonic acid amide-(2)-(cyclopentylmethyl)-methyl-amide-(4) mentioned in the experimental report and produced according to German publ. patent specification 1,111,618, is obtained as follows:

Cyclopentylmethylamine is converted with formic acid ester into the N-formyl-cyclopentylmethylamine, B.P. 128° C. at 12 mm. Hg, and then hydrogenated with $LiAlH_4$ to the N-methyl-cyclopentylmethylamine of B.P. 62° C. at 90 mm. Hg.

By reaction with 4-chloro-3-sulphamylbenzene sulphochloride-(1) in acetone in the presence of molar amounts of potash, the sulphonamide of M.P. 168° C. results.

The invention is further illustrated by the following non-limitative examples.

EXAMPLE 1

Chlorobenzene-2,4-disulphonic acid amide-(2)-α-tetrahydrofurfuryl-N-methylamide-(4).

13.8 grams potash are slurried in 100 ml. acetone. 11.5 grams α-tetrahydrofurfuryl-methylamine are added dropwise, and 29 g. of 4-chloro-3-sulphamyl-benzenesulphochloride are then introduced. The mixture is heated at boiling temperature for 15 minutes and stirred overnight at room temperature. The solvent is then driven off, the residue mixed thoroughly with water, filtered off with suction, and recrystallized from alcohol; M.P. 126° C., Yield: 28 g.

*Analysis.*—$C_{12}H_{17}ClN_2O_5S_2$ (368.5). N calc.: 7.62%. N found: 7.71%.

In similar manner 4 - chloro - 3 - sulfonamido-1-{N-methyl - N - [2',5' - dimethyl-2'-dihydropyranylmethyl-($\Delta^{5,6}$)]}-benzenesulfonamide of the formula:

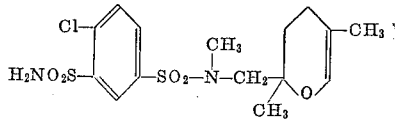

having a melting point of 135–137° C. is prepared in a yield of 56% of theory by the reaction of 4-chloro-3-sulfamyl-1-benzenesulfochloride with N-methyl-N-[2,5-dimethyl-2-dihydropyranylmethyl-($\Delta^{5,6}$)] - amine, Kp.$_{12}$ 74° C., prepared by the reductive alkylation of the corresponding aldehyde.

Similarly 4 - chloro - 3 - sulfonamido-1-[N-methyl-N-(2',5' - dimethyl-2'-tetrahydropyranylmethyl)]-benzenesulfonamide of the formula:

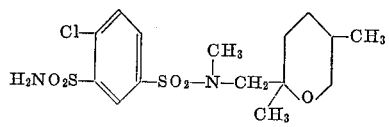

having a melting point of 114–122° C. is formed in 72% yield by the reaction of N-methyl-N-(2,5-dimethyl-2-tetrahydropyranylmethyl)-amine Kp.$_{12}$ 70° C., available through the catalytic hydrogenation of the above-named dihydropyranylmethylamine, with 4-chloro-3-sulfamyl-1-benzenesulfochloride.

By the reaction of N-methyl-N-(2-ethyl-2-tetrahydrofurylmethyl)-amine with 4-chloro-3-sulfamyl-1-benzenesulfochloride there is formed 4-chloro-3-sulfonamido-1-[N-methyl-N-(2'-ethyl-2'-tetrahydrofurylmethyl)] - benzenesulfonamide of the formula:

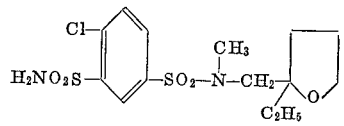

in a yield of 75% as a yellowish oil. The amine needed for the preparation of this compound has not hitherto been described and is obtained in the following manner:

By the reaction of γ-chloropropyl-ethylketone with KCN there is formed 2-ethyl-2-cyanotetrahydrofuran, Kp.$_{12}$ 70° C., which is catalytically reduced to 2-ethyl-2-aminomethyltetrahydrofuran, Kp.$_{12}$ 64° C. Acylation with formic acid yields the N-formyl compound, Kp.$_{0.4}$ 100–110° C. which is reduced with lithium aluminum hydride to N - methyl-N-(2-ethyl-2-tetrahydrofurylmethyl)-amine, Kp.$_{50}$, 92–94° C.

In similar manner there are produced:

Chlorobenzene - 2,4 - disulfonic acid amide-(2)-[α-(α,α',α'-trimethyl) - tetrahydrofurfuryl]-N-methylamide-(4) of the formula:

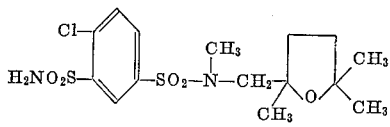

having a melting point of 139–141° C. in a yield of 76% of theory. The 2,5,5 - trimethyltetrahydrofurfuryl - N-methylamine, Kp.$_{12}$ 56–58° C. used as the starting material is obtained in the following manner:

5-methyl-hexane-(4)-one-(2) is reacted with KCN in aqueous solution to 2-cyano-5-methyl-hexene-(4)-ol-(2), Kp.$_{15}$ 112° C.; esterification with butanol and HCl gas yields the 2-carbobutoxy - 5 - methyl-hexene-(4)-ol-(2), Kp.$_{12}$ 100–102° C., which is saponified under alkaline conditions to 2-carboxy - 5 - methyl-hexene-(4)-ol-(2), Kp.$_{0.4}$ 120–122° C. Subsequent treatment with P$_2$O$_5$ at 30 mm. and 130–140° C. yields under cyclization 2,5,5-trimethyltetrahydrofurancarbonic acid, Kp.$_{12}$ 104–106° C.; 2,5,5-trimethyltetrahydrofurancarbonic acid methyl ester, Kp.$_{30}$ 88° C.; 2,5,5-trimethyltetrahydrofurancarbonic acid-N-methylamide, Kp.$_{13}$ 104° C.

Chlorobenzene - 2,4 - disulfonic acid-(2)-[α-(α,α'-dimethyl)-tetrahydrofurfuryl]-N-methylamide-(4) of the formula:

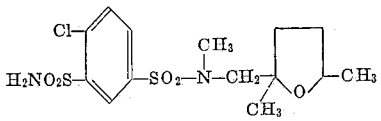

having a melting point of 126–128° C. and a yield of 72% of theory. The preparation of the 2,5-dimethyltetrahydrofurfuryl-N-methylamine, Kp.$_{22}$ 62° C. used as the starting material results from the following procedure:

2,5-dimethyltetrahydrofuran-2-carbonic acid, Kp.$_{10}$ 112° C. is esterified with methanol/sulfonic acid to 2,5-dimethyltetrahydrofuran-2-carbonic acid methyl ester, then converted with monomethylamine into 2,5 - dimethyltetrahydrofuran-2-carbonic acid-N-methylamide, Kp.$_{12}$ 98–100° C. and thereafter reduced with lithium aluminum hydride.

Chlorobenzene-2,4-disulfonic acid amide-(2)-[α-(α,α', α' - trimethyl) - tetrahydropyranylmethyl] - N - methylamide of the formula:

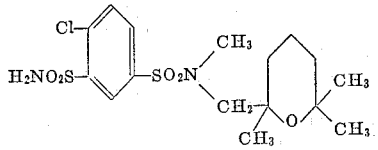

having a melting point of 138–141° C. and a yield of 54% of theory.

Starting material:

2,2,6-trimethyl-tetrahydropyranyl-2-carbonic acid, Kp.$_{13}$ 127–129° C., melting point 83–84° C.;
2,6,6-trimethyl-tetrahydropyranyl-2-carbonic acid methylester, Kp.$_{50}$ 110° C.;
2,6,6-trimethyl-tetrahydropyranyl-2-carbonic acid-N-methylamide, Kp.$_{12}$ 120° C.;
2,6,6-trimethyl-2-(tetrahydropyranylmethyl)-N-methylamine, Kp.$_{25}$ 95–97° C.

EXAMPLE 2

Chlorobenzene - 2,4 - disulfonic acid amide - (2) - α - tetrahydrofurfuryl-N-methylamide-(4).

Into a mixture of 11.5 grams N-(α-tetrahydrofurylmethyl)-methylamine and 100 ml. pyridine, there are introduced with ice-cooling 29 g. of 4-chloro-3-sulphamyl-benzene-sulphochloride-(1). The mixture is stirred overnight at room temperature, half the solvent is driven off in vacuum, the residue is treated with 200 ml. of 2 N HCl, and the sulphonamide is crystallized by trituration. After recrystallizing from alcohol, the compound melts at 125–128° C. Yield: 31 g.

EXAMPLE 3

(—)-Chlorobenzene-2,4-disulphonic acid amide-(2)-α-tetrahydrofurfuryl-N-methylamide-(4).

This compound is produced by reacting 4-chloro-3-sulphamyl-benzenesulphochloride with the laevorotatory form of α-tetrahydrofurfurylmethylamine in analogous manner to that of Example 1 or 2. M.P. 154° C. [α]$_{578}$—20° (methanol, 1.5%). Yield 78% of the theoretical.

The (—)-α-tetrahydrofurfurylmethylamine used as starting material is obtained by racemic resolution with the aid of L(—)-O,O-dibenzoyl-tartaric acid, or by formylation of (—)-α-tetrahydrofurfurylamine with formic acid ester to give (—)-α-tetrahydrofurfuryl-formylamine, and subsequent reduction with lithium aluminum hydride:

(—)-α-Tetrahydrofurfuryl-methylamine of B.P. 50° C. at 16 mm. Hg; hydrochloride M.P. 130 to 132° C., [α]$_{578}$—41.93° (1.55% in water).

EXAMPLE 4

(+)-Chlorobenzene-2,4-disulphonic acid amide-(2)-α-tetrahydrofurfurylmethylamide-(4).

The production proceeds by analogy with Example 3. M.P. 154° C. [α]$_{578}$+19.92 (methanol 1.5%).

The (+)-α-tetrahydrofurfuryl-methylamine used as starting material is obtained by the method described in the foregoing example, B.P. 50° C. at 15 mm. Hg; hydrochloride M.P. 130 to 132° C. [α]$_{578}$+42.08° (1.5% in water).

EXAMPLE 5

Chlorobenzene-2,4-disulphonic acid amide-(2)-α-tetrahydrofurfurylamide-(4).

6.9 grams potash are suspended in 100 ml. acetone. 5.1 grams α-tetrahydrofurfurylamine are then added dropwise and 14.5 g. 4-chloro-3-sulphamyl-benzene sulphochloride-(1) are introduced with stirring. The mixture is heated under reflux for 15 minutes, and, after driving off the solvent, thoroughly mixed with water and filtered off with suction. The sulphonamide is recrystallized from alcohol. M.P. 136° C. Yield: 11 g.

*Analysis.*—C$_{11}$H$_{15}$ClN$_2$O$_5$S$_2$ (354.5). N calc.: 7.92. N found 7.66.

The optical antipodes of the above racemate obtained in analogous manner have the following constants.

Laevorotatory form:
M.P. 120–122° C. [α]$_{578}$—16.5° (methanol, 1.25%)

Dextrorotatory form:
M.P. 120–122° C. [α]$_{578}$+15.9° (methanol, 1.25%)

The (—)-α-tetrahydrofurfuryl-amine used as starting material is obtained by racemic resolution with the aid of L(+)-tartaric acid: (—)-tetrahydrofurfurylamine B.P. 55° C. at 18 mm. Hg, hydrochloride M.P. 108–109° C., [α]$_{578}$—33.17° (1.1% in water).

The (—)-α-tetrahydrofurfuryl-amine used as starting material is obtained by racemic resolution with the aid of D(—)-tartaric acid: (+)-tetrahydrofurfurylamine, B.P. 55° C. at 18 mm. Hg, hydrochloride M.P. 108–109° C., [α]$_{578}$+33.33° (1.35% in water).

Similarly to Example 1 or 2 there are obtained:

Chlorobenzene-2,4-disulphonic acid-amide-(2)-α-tetrahydrofurfuryl-ethylamide-(4)
M.P. 129° C. Yield 72% of the theoretical.
Chlorobenzene-2,4-disulphonic acid-amide-(2)-α-tetrahydrofurfuryl-propyl-amide-(4)
M.P. 131° C. Yield 69% of the theoretical.
Chlorobenzene-2,4-disulphonic acid-amide-(2)-α-tetrahydrofurfuryl-isopropylamide-(4)
Non-distillable oil. Yield 85% of the theoretical.
Chlorobenzene-2,4-disulphonic acid-amide-(2)-α-tetrahydrofurfuryl-isobutylamide-(4)
M.P. 85–90° C. Yield 52% of the theoretical.
Chlorobenzene-2,4-disulphonic acid-amide-(2)-α-furfuryl-amide-(4)
M.P. 130° C. Yield 81% of the theoretical.
Chlorobenzene-2,4-disulphonic acid-amide-(2)-α-furfuryl-N-methylamide-(4)
M.P. 144° C. Yield 78% of the theoretical.
Chlorobenzene-2,4-disulphonic acid-amide-(2)-(β-tetrahydropyranylmethyl)-amide-(4)
M.P. 136° C. Yield 84% of the theoretical.

Chlorobenzene-2,4-disulphonic acid-amide-(2)-(α-tetra-hydropyranyl-methyl)-amide-(4)
M.P. 158° C. Yield 93% of the theoretical.
Chlorobenzene-2,4-disulphonic acid-amide-(2)-(β-tetra-hydro-pyranylmethyl)-N-methyl-amide-(4)
M.P. 156° C. Yield 77% of the theoretical.
Chlorobenzene-2,4-disulphonic acid-amide-(2)-(α-tetrahydro-pyranylmethyl)-N-methyl-amide-(4)
M.P. 156° C. Yield 62% of the theoretical.
Chlorobenzene-2,4-disulphonic acid-amide-(2)-[α-(α'-methyl)-furfuryl]-N-methylamide-(4)
M.P. 142° C. Yield 64% of the theoretical.
Chlorobenzene-2,4-disulphonic acid-amide-(2)-[α-(α-methyl)-tetrahydrofurfuryl]-amide-(4)
M.P. 159° C. Yield 82% of the theoretical.
(+)-chlorobenzene-2,4-disulphonic acid-amide-(2)-[α-(α-methyl)-tetrahydrofurfuryl]-N-methylamide-(4)
of M.P. 145–147° C.
Yield: 85% of theory; $[α]_{546}+6.2°$; $[α]_{436}+10-35°$; $[α]_{405}+12.6°$; $[α]_{365}+17.55°$ (all values calculated in 2.02% methanolic solution).

The starting material for the preparation of this compound is:
(−)-2-methyl-2-methylaminomethyl-tetrahydrofuran which is obtained by the racemic resolution of dl-2-methyl-2-methylaminomethyl-tetrahydrofuran with L(+)-tartaric acid in ethanol: Kp.$_{45}$ 70–74°, $[α]_{578}(−)2.25°$ $[α]_{365}−6.75°$ (1.6% chloroform); hydrochloride M.P. 196° C. $[α]_{578}+10.9°$, $[α]_{365}+25.94°$ (1.15% methanol), L(+)-tartrate M.P. 137° C. $[α]_{578}+19.65°$ (2.06% methanol).

(−)-Chlorobenzene-2,4-disulphonic acid-amide-(2)-[α-(α-methyl)-tetrahydrofurfuryl]-N-methylamide-(4) of M.P. 145–146° C. Yield: 84% of theory; $[α]_{578}−5.7°$; $[α]_{546}−6.7°$; $[α]_{436}−10.9°$; $[α]_{405}−13.4°$; $[α]_{365}−17.1°$ (all values calculated in 2.02% methanolic solution).

The starting material for the preparation of this compound is:
(+)-2-methyl-2-methylaminomethyl-tetrahydrofuran which is prepared by the racemic resolution of dl-2-methyl-2-methyl-aminomethyl-tetrahydrofuran with D(−) tartaric acid: Kp.$_{50}$ 74–78°; $[α]_{578}+2.12°$; $[α]_{365}+6.65°$ (2.6% chloroform); hydrochloride M.P. 196° C. $[α]_{578}−11.33°$; $[α]_{365}−26.29°$ (1.5% methanol); D-(−)-tartrate M.P. 137° C.; $[α]_{578}−19.85°$ (2.52% methanol).

(−)-Chlorobenzene-2,4-disulphonic acid-amide-(2)-[α-(α-methyl)-tetrahydrofurfuryl]-amide-(4) of M.P. 172–174° C. Yield: 83% of theory; $[α]_{548}−13.1°$; $[α]_{546}−15.0°$; $[α]_{436}−26.0°$; $[α]_{405}−31.1°$;

$[α]_{365}−40.0°$ (2.02% methanol)

The starting material for the preparation of this compound is:
(−)-2-methyl-2-aminomethyl-tetarhydrofuran which is obtained by the resolution of dl-2-methyl-2-aminomethyl-tetrahydrofuran with L(+)-tartaric acid in methanol: Kp.$_{90}$ 94° $[α]_{578}−4.5°$; $[α]_{405}−8.75°$ (1.542% chloroform); hydrochloride $[α]_{578}−8.82°$; $[α]_{365}−20.6°$ (1.7% methanol); L(+)-tartrate M.P. 177° C.

$[α]_{578}+8.37°$ (3.05% methanol)

(+)-Chlorobenzene-2,4-disulphonic acid-amide-(2)-[α-(α-methyl)-tetrahydrofurfuryl]-amide-(4) of M.P. 172–174° C. Yield: 85% of theory. $[α]_{578}+13.2°$; $[α]_{545}+14.5°$; $[α]_{436}+26.1°$; $[α]_{405}+30.8°$; $[α]_{365}+44.5°$ (2% methanol).

The starting material for the preparation of this compound is:
(+)-2-methyl-2-aminomethyl-tetrahydrofuran which is prepared by the resolution of dl-2-methyl-2-aminomethyl-tetrahydrofuran with D(−)-tartaric acid: Kp.$_{90}$ 94°, $[α]_{578}+4.3°$; $[α]_{405}+8.4°$ (1.39% chloroform); hydrochloride: $[α]_{578}+8.42°$; $[α]_{365}+20.1°$ (2.8% methanol); D(−)-tartrate M.P. 177° C. $[α]_{578}−8.31°$ (2.7% methanol).

Chlorobenzene-2,4-disulphonic acid-amide-(2)-[α-(α-methyl)-tetrahydrofurfuryl]-N-methylamide-(4)
M.P. 148–150° C. Yield 88% of the theoretical.
Chlorobenzene-2,4-disulphonic acid-amide-(2)-[3'-(α-tetrahydrofuryl)-propyl]-N-methylamide-(4)
Yield 43% of the theoretical, waxy consistency.
Chlorobenzene-2,4-disulphonic acid-amide-(2)-[α-(α'-methyl)-tetrahydrofurfuryl]-N-methylamide-(4)
M.P. 128 to 135° C. Yield 62% of the theoretical.
Chlorobenzene-2,4-disulphonic acid-amide-(2)-[α-(α'-methyl)-tetrahydrofurfuryl]-amide-(4)
M.P. 128 to 130° C. Yield 74% of the theoretical.
Chlorobenzene-2,4-disulphonic acid-amide-(2)-[α-(α'-methoxymethyl)-tetrahydrofurfuryl]-N-methyl-amide-(4)
M.P. 117 to 122° C. Yield 54% of the theoretical.
Chlorobenzene-2,4-disulphonic acid-amide-(2)-β-tetrahydrofurfuryl-N-methylamide-(4)
M.P. 134° C. Yield 62% of the theoretical.
Chlorobenzene-2,4-disulphonic acid-amide-(2)-[2'-dihydropyranyl-methyl-(Δ5,6)]-amide-(4)
M.P. 93 to 96° C. Yield 42% of the theoretical.
Chlorobenzene-2,4-disulphonic acid-amide-(2)-[2'-dihydropyranyl-methyl-(Δ5,6)-]-N-methyl-amide-(4)
M.P. 143° C. Yield 45% of the theoretical.

EXAMPLE 6

Chlorobenzene-2,4-disulphonic acid-amide-(2)-α-tetrahydrofurfuryl-methyl-amide-(4).
20 grams of chlorobenzene-2,4-disulphonic acid amide-(2)-α-furyl-N-methylamide-(4) are hydrogenated in 200 ml. of tetrahydrofuran in the presence of ruthenium/Al$_2$O$_3$ at 100° C. and 100 atm. hydrogen pressure. The material is filtered off with suction from the catalyst, evaporated and the residue recrystallized from methanol. Yield: 12 g.; M.P. 126° C.

What is claimed is:
1. A racemic or optically active compound of the formula:

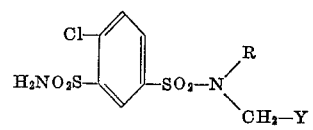

wherein:
R is hydrogen or methyl and
Y is tetrahydrofuryl or lower alkyl-substituted tetrahydrofuryl.
2. Racemic 4-chloro-3-sulfonamido-1[N-methyl-N-(2'-ethyl-2'-tetrahydrofurylmethyl)]-benzenesulfonamide.
3. Racemic chlorobenzene-2,4-disulphonic acid amide-(2)-[α-(α-methyl)-tetrahydrofurfuryl]-amide-(4).
4. Racemic chlorobenzene-2,4-disulphonic acid amide-(2)-[α-(α-methyl)-tetrahydrofurfuryl]-N-methylamide-(4).
5. Racemic chlorobenzene-2,4-disulphonic acid-amide-(2)-β-tetrahydrofurfuryl-N-methylamide-(4).
6. Racemic chlorobenzene-2,4-disulfonic acid-(2)-[α-(α,α'-dimethyl)-tetrahydrofurfuryl]-N-methylamide-(4).
7. The compound (+)-chlorobenzene-2,4-disulphonic acid amide-(2)-[α-(α-methyl)-tetrahydrofurfuryl]-N-methylamide-(4).
8. The compound (−)-chlorobenzene-2,4-disulphonic acid amide-(2)-[α-(α-methyl)-tetrahydrofurfuryl]-N-methylamide-(4).
9. The compound (−)-chlorobenzene-2,4-disulphonic acid amide-(2)-[α-(α-methyl)-tetrahydrofurfuryl]-amide-(4).

10. The compound (+)-chlorobenzene-2,4-disulphonic acid amide-(2)-[α-(α-methyl)-tetrahydrofurfuryl]-amide-(4).

References Cited
UNITED STATES PATENTS

| | | | |
|---|---|---|---|
| 2,910,488 | 10/1959 | Novello | 260—556 |
| 3,004,024 | 10/1961 | Barnstein et al. | 260—243 |
| 3,014,906 | 12/1961 | Gadekar et al. | 260—397.7 |
| 3,119,843 | 1/1964 | Jucker et al. | 260—347.2 |
| 3,119,845 | 1/1964 | Jucker et al. | 260—347.2 |
| 3,133,918 | 5/1964 | MacPhillamy | 260—345.1 |
| 3,164,517 | 1/1965 | Novello | 260—397.7 |
| 3,167,556 | 1/1965 | Krapcho | 260—347.2 |

FOREIGN PATENTS

| | | |
|---|---|---|
| 1,111,618 | 7/1961 | Germany. |
| 1,126,862 | 4/1962 | Germany. |

WALTER A. MODANCE, *Primary Examiner.*

JOHN M. FORD, *Assistant Examiner.*